United States Patent
Hunt et al.

(10) Patent No.: US 8,031,131 B2
(45) Date of Patent: Oct. 4, 2011

(54) INTERFACE COMPUTER FOR A STAGE LIGHTING SYSTEM

(75) Inventors: Mark A. Hunt, Derby (GB); Ian Clarke, Walsall (GB)

(73) Assignee: Production Resource Group, LLC, New Windsor, NY (US)

( * ) Notice: Subject to any disclaimer, the term of this patent is extended or adjusted under 35 U.S.C. 154(b) by 1361 days.

(21) Appl. No.: 10/913,006

(22) Filed: Aug. 5, 2004

(65) Prior Publication Data

US 2005/0057543 A1 Mar. 17, 2005

Related U.S. Application Data

(60) Provisional application No. 60/493,532, filed on Aug. 7, 2003.

(51) Int. Cl.
*G09G 5/00* (2006.01)

(52) U.S. Cl. ............................. 345/2.2; 345/690

(58) Field of Classification Search ................ 345/102, 345/211, 690, 1.1–3.3, 30, 87, 89; 315/312, 315/297; 340/825.22; 359/291; 362/85, 362/312

See application file for complete search history.

(56) References Cited

U.S. PATENT DOCUMENTS

| | | | |
|---|---|---|---|
| 4,511,824 A * | 4/1985 | Goddard | 315/297 |
| 5,307,055 A * | 4/1994 | Baskin et al. | 345/2.2 |
| 5,353,074 A * | 10/1994 | Jones et al. | 345/473 |
| 5,414,328 A | 5/1995 | Hunt et al. | |
| 5,812,596 A | 9/1998 | Hunt et al. | |
| 5,859,623 A * | 1/1999 | Meyn et al. | 345/698 |
| 5,969,485 A | 10/1999 | Hunt | |
| 5,983,280 A | 11/1999 | Hunt | |
| 6,020,825 A * | 2/2000 | Chansky et al. | 340/825.22 |
| 6,029,122 A | 2/2000 | Hunt | |
| 6,175,771 B1 | 1/2001 | Hunt et al. | |
| 6,549,326 B2 | 4/2003 | Hunt et al. | |
| 6,565,941 B1 | 5/2003 | Hewlett | |
| 6,806,885 B1 * | 10/2004 | Piper et al. | 345/2.1 |
| 6,969,960 B2 * | 11/2005 | Belliveau | 315/312 |
| 6,980,195 B2 * | 12/2005 | Lonoce et al. | 345/102 |
| 7,027,972 B1 * | 4/2006 | Lee | 719/323 |
| 7,158,094 B2 * | 1/2007 | Wilks | 345/1.1 |
| 2001/0040568 A1 * | 11/2001 | Park | 345/211 |
| 2002/0097210 A1 * | 7/2002 | Lonoce et al. | 345/87 |
| 2002/0109905 A1 * | 8/2002 | Hunt et al. | 359/291 |
| 2002/0140724 A1 * | 10/2002 | Qureshi et al. | 345/717 |
| 2003/0146884 A1 * | 8/2003 | Heo | 345/30 |
| 2005/0083487 A1 | 4/2005 | Hunt et al. | |
| 2005/0086589 A1 | 4/2005 | Hunt | |
| 2005/0094635 A1 | 5/2005 | Hunt | |
| 2005/0190985 A1 | 9/2005 | Hunt | |
| 2005/0200318 A1 | 9/2005 | Hunt et al. | |
| 2006/0158461 A1 | 7/2006 | Reese et al. | |
| 2006/0187532 A1 | 8/2006 | Hewlett et al. | |
| 2006/0227297 A1 | 10/2006 | Hunt | |

* cited by examiner

*Primary Examiner* — Chanh Nguyen
*Assistant Examiner* — Adam J Snyder
(74) *Attorney, Agent, or Firm* — Law Office of Scott C. Harris, Inc.

(57) ABSTRACT

A stage lighting system with a digital and analog part. The digital part is used to form the image, which can be, for example, a full brightness image. The analog part is used to dim the image, and to carry out failsafe operation. If an error occurs in the digital part, then the analog part prevents the image from being shown.

33 Claims, 4 Drawing Sheets

INTERFACE COMPUTER FOR A STAGE LIGHTING SYSTEM

CROSS-REFERENCE TO RELATED APPLICATION

This application claims benefit of the priority of U.S. Provisional Application Ser. No. 60/493,532 filed Aug. 7, 2003 and entitled "Interface Computer for a Stage Lighting System".

BACKGROUND

Stage lighting control can be extremely complex. A control console can be used to control a number of different lights which collectively form a show. Each of the lights can be controlled to move in different ways and to project different effects including shapes for light, video effects, color, and other things. Digital techniques have enabled stage lights to produce many different effects, however they have also produced complexities. As the capabilities increase, the control becomes more complex.

SUMMARY

The present system teaches a lighting control system in which a computer or other interface device is controlled by a lighting control console, and used to control an external controlled light which may be a projector or the like. The external controlled light can be controlled according to many different complex effects.

BRIEF DESCRIPTION OF THE DRAWINGS

These and other aspects will now be described in detail with reference to the accompanying drawings, in which.

DETAILED DESCRIPTION

Figure 1:
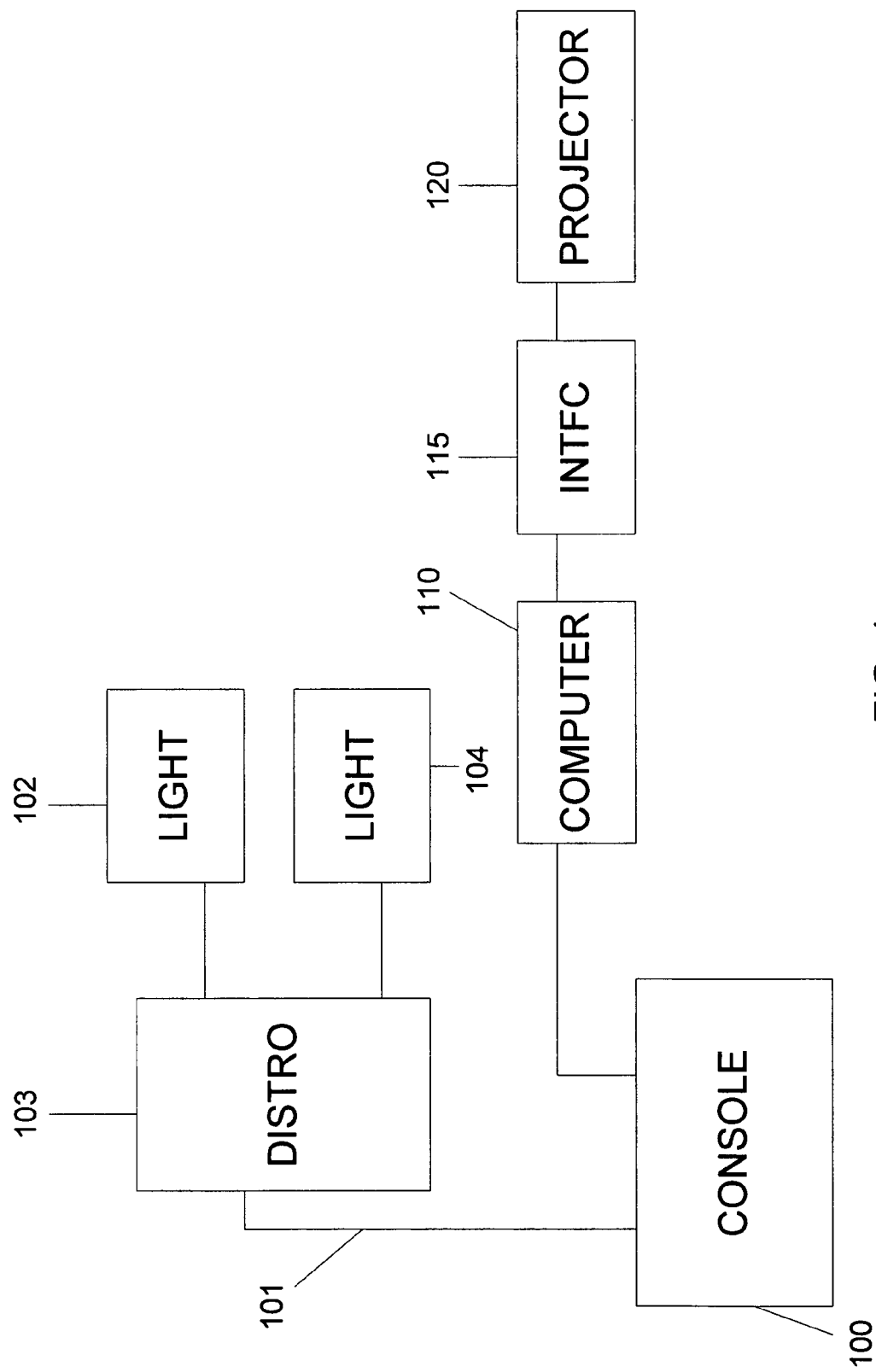
FIG. 1 shows a basic block diagram of the system.

FIG. 1 shows a basic block diagram of the present system. In the FIG. 1 embodiment, a lighting control console 100, which may be an ICON™ console is used to control a number of controllable lights collectively forming a lighting show. An output line 101 may be connected to a "distro" 103, that controls lights 102 and 104 of conventional types. These may be lights that are available from, for example, Light and Sound Design Ltd., or from other comparable vendors. These lights typically have certain functionality built therein.

The device of the present system also includes a computer based light 110 which runs software to carry out the functions commanded by the console. The computer light may be output to an interface card 115 which may drive lighting projector 120. For example, this may drive a DMD type projector. The projector 120 projects information as commanded by the computer 110.

Understandably, the computer 110 must carry out certain relatively complicated functions. The computer, for example may carry out drawing routines and the like. Accordingly, by locating the computer separately from the light, extremely powerful effects are enabled.

The present inventor noted a number of different problems in the system. First of all, during the control by the computer, a large number of operations and specifically numerical operations, each need to be carried out. Complex calculation may cause problems in the computer, and specifically may cause the computer to crash. If the computer crashes, the output will include an indication of the crash, e.g., a "blue screen" or equivalent. It would be extremely undesirable for such an indication to be shown by the projector during a show.

Another problem may be caused by fading effects. It is possible to cause fading effects on the computer by drawing the output from the computer at a lower intensity. However, as the drawn screen fades, it is more difficult for even the operator to see it on the monitoring screen. Moreover, after an image has been caused to fade, it cannot be replaced. Certain effects, such as so-called decay, in which the image is caused to repeatedly replaced, cannot be easily carried out with this system.

Accordingly, and even though the computer is quite capable of producing a dimmed-intensity image, the present system uses an external interface board 115 which carries out an analog based dimming on the digitally produced image.

Figure 2:
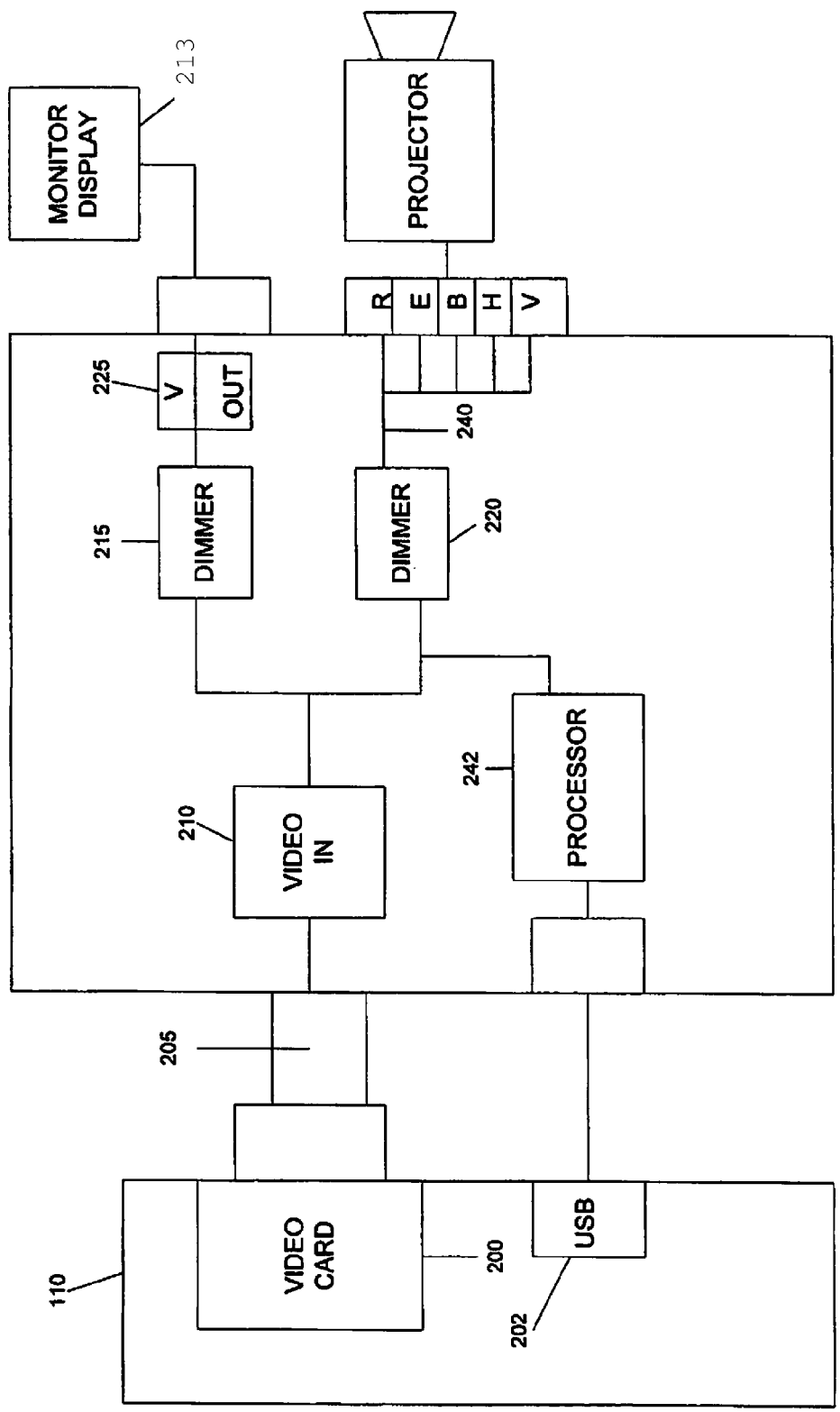
FIG. 2 shows a block diagram of the interface board which is used.

Interface 115 may have the general layout shown in block diagram form in FIG. 2.

FIG. 2 shows the computer 110 which operates as described further herein, but basically operates to produce an image whose output will drive a stage lighting device. The image may be produced using conventional computer graphics technique, and as described herein, this may use standard "openGL" components in order to draw an image in the video card.

The video card 200 of the computer is shown in FIG. 2. In an embodiment, this video card may draw the image at full intensity. The video output 205, which is a full intensity image is coupled to a video in connector 210. Video in connector is coupled to a first dimmer 215 and a second dimmer 220. These dimmers can be separately controlled so that the output on the operator's monitor display can be the same as or different from the output being viewed.

Video output connector 225 is connected to a video screen 231 which may form a monitor which allows a user to monitor the video output. Under computer control, the monitor screen 230 can either show a full intensity version of the output of the video card, or can show the actual dimmer version. Since the dimmers 215, 220 can be separately controlled, the operator can switch whether they see the dimmed version or the full intensity version.

The USB port 202 from the computer 110 is also connected to a corresponding USB input 230 on the dimmer board, which controls an onboard processor 242 to allow controlling the dimmers as described herein.

The dimmer 215 controls the intensity that is viewed by the operator locally. The dimmer 220 controls the output intensity. Again, however, this enables the video card 200 to output its video at full intensity, while still producing a dimmed version of the image as output to the light.

The computer 110 executes a routine described further herein. According to this routine, the output light 240 which will be seen on the projector is immediately faded to complete black whenever a control screen is being executed by the computer 110. In addition, the computer 110 must produce new dimmer outputs at each frame update, even if they are the same as the previous. The processor 242 on the dimmer board expects these updates at each frame. If the processor 242 does not receive these frame updates, it immediately commands the dimmer to fade to black.

Figure 3:
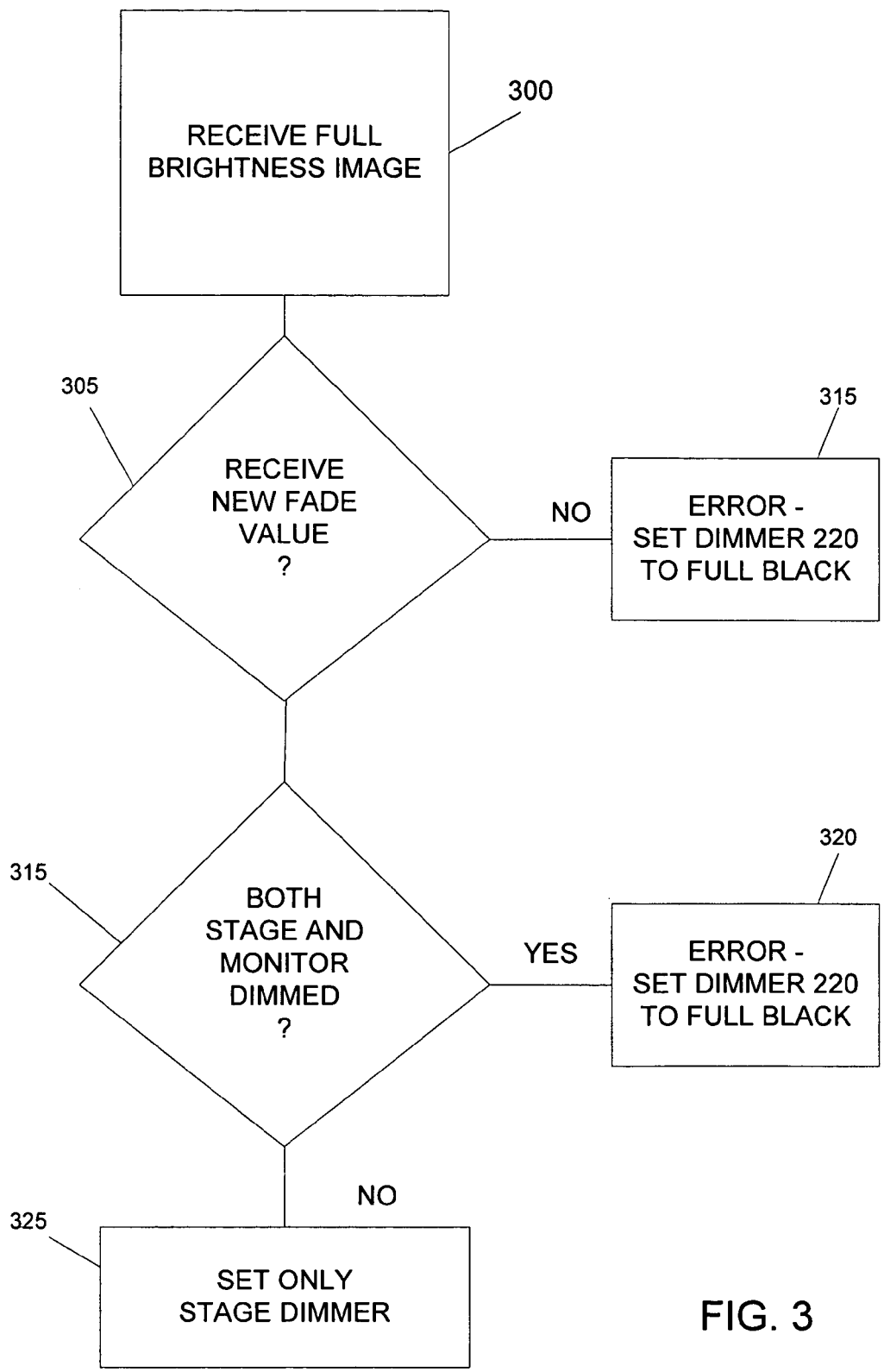
FIG. 3 shows a flowchart of operation.

The processor on the dimmer board operates according to the flowchart of FIG. 3. It should be understood, however, that processor 242 may carry out additional functions in addition to those described herein. At 300, the system receives a full brightness image. Of course, the image which is produce need not be full brightness. At 305, the system determines if it has received a new fade value for the current frame. If not, then an error has occurred in the computer, and the output of the dimmer 220, that draws the output screen, is set to black at 310. This prevents any kind of crash screen or control screen from being displayed as part of the show.

At 315, the system determines whether both the stage output and the monitor output have been commanded to dim. If so, then both dimmers are set to the controlled value at 320. If not, then only the output dimmer bank is set to the controlled value at 325.

This produces a number of advantages in which both the show attendees are prevented from seeing control screens, but also the operator can see a full brightness image. Further the video card can draw a full brightness image to allow certain effects.

Figure 4:
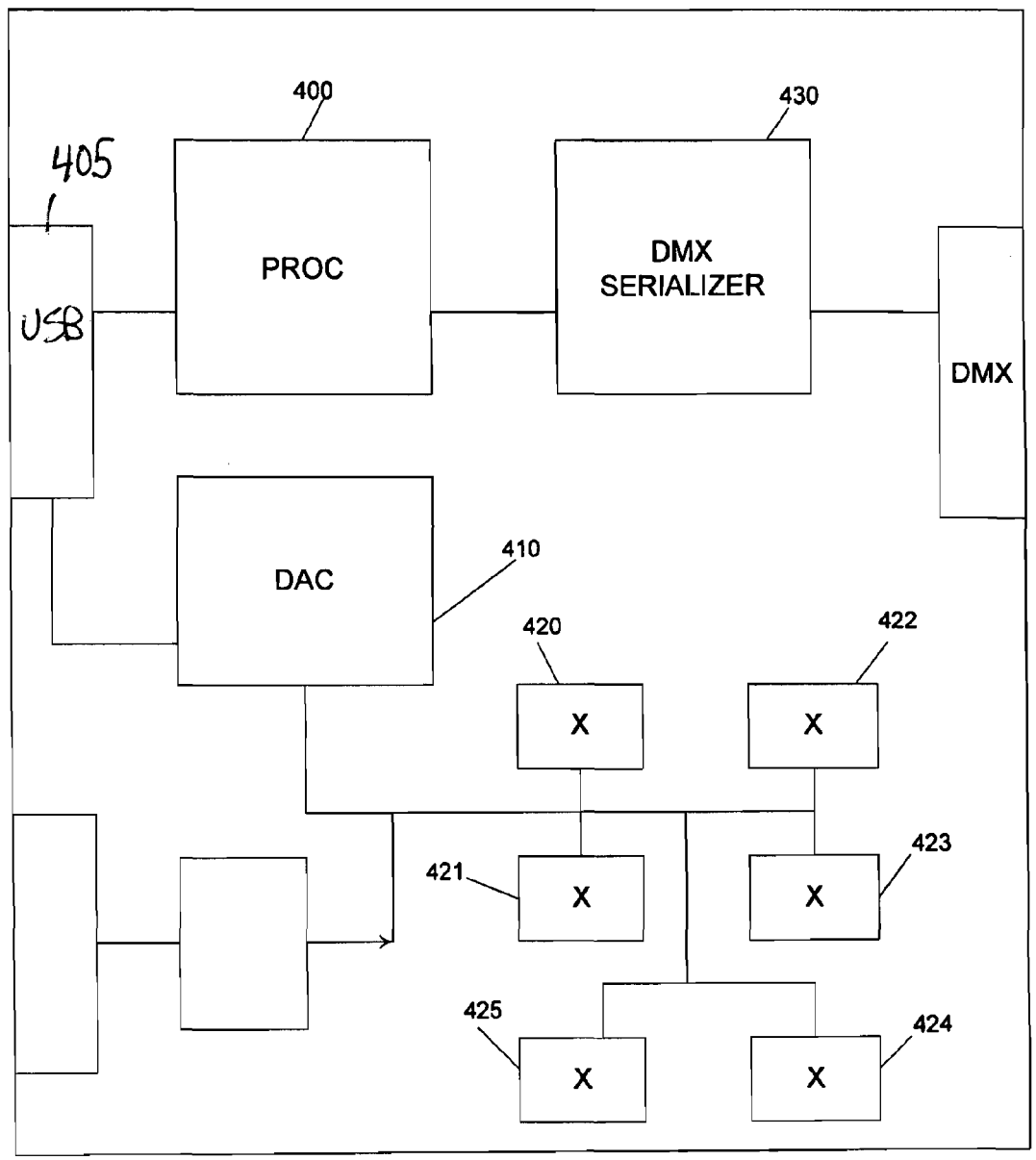
FIG. 4 shows more detail about the interface card.

A more detailed block diagram of the dimmer card is shown in FIG. 4. The USB connector 405 provides a control line which controls the operation of the dimmer card. The processor 400 drives the USB and receives commands from that card. The output of the processor drives a decay converter 410 which produces analog output voltages which are sent to each of six different analog multipliers 420-426. There are two different banks of analog multipliers. One bank of analog multipliers is to produce the output for the stage, and includes a multiplier for each of red, green and blue. The other analog multiplier bank is for the local monitor, and includes one analog multiplier for each of red green and blue, but drives the output for the local display.

A DMX 512 output may also be produced from a DMX serializer chip 430. This may be in output in conventional DMX-512 format which provides the states of the output of the dimmers in a timeslot multiplexed format.

Although only a few embodiments have been disclosed in detail above, other modifications are possible. All predictable modifications are intended to be encompassed within the following claims.

What is claimed is:

1. A lighting control system, comprising:
a computer that receives a light control indicative of an image on which a projected light beam will be based, said light control including a control of a fading effect for said image, where said image being a full intensity image;
said computer including a video card that operates using a computer-based image drawing system in the video card driven by a computer graphics driver, said computer-based image drawing system being programmed to produce an entirety of an image output at full intensity as an output of said video card, and also being capable of producing a dimmed intensity image based on said output of said video card, said dimmed intensity image being at an intensity which is less than said full intensity image; and
a second dimmer board, separate from said computer-based image drawing system and separate from said video card, receiving said output of said video card from said video card, and said second dimmer board including a first dimmer and a second dimmer, said first dimmer producing a first output in a form to be displayed by an external stage light at a first dimmed level controlled by said first dimmer, and said second dimmer producing a second output in a form to be displayed on a monitor display, at a second dimmed level controlled by said second dimmer, wherein said second dimmed level is different than said first dimmed level.

2. A lighting control system as in claim 1, wherein said first dimmer and said second dimmer are analog dimmers.

3. A lighting control system as in claim 1, wherein said second dimmer board detects a malfunction, and operates to dim only said first output but not operating to dim said second output based on said malfunction being detected.

4. A lighting control system as in claim 3, wherein said second output is dimmed to full dimming based on detecting said malfunction.

5. A lighting control system as in claim 3, wherein said second dimmer board detects said malfunction including detecting whether a new value has been received within a specified amount of time, and establishing a malfunction when said new value is not received within said specified amount of time.

6. A lighting control system as in claim 1, wherein said computer graphics driver is open g1.

7. A lighting control system as in claim 6, wherein said first dimmer and said second dimmer include analog multipliers.

8. A lighting control system as in claim 6, wherein said first dimmer and said second dimmer each include three analog multipliers, one configured for each of the primary colors.

9. A lighting control system as in claim 1, further comprising a lighting console producing said light control, and also producing plural additional outputs, each of said plural additional outputs for controlling additional connected stage lighting devices other than said external stage light, said additional connected stage lighting devices including at least first and second additional stage lighting devices other than said external stage light.

10. A lighting control system as in claim 1, further comprising a serializer which produces outputs indicative of a status.

11. A method of controlling a lighting effect, comprising
receiving a control signal indicative of an image and a desired brightness of the image;
using said control signal to control a digital video generator, which is capable of generating a digitally dimmed image, said digital video generator creating an entirety of the image at a brightness greater said desired brightness using a video card driven by a computer graphics driver, and said digital video generator creating an image output;
using said control signal to control a first dimmer device and a second dimmer device separate from said digital video generator to receive the image output from said digital video generator, and which carry out a dimming of the entirety of the image output created by said digital video generator, said first and second dimmer devices separate from and not included in said video card, and said first dimmer device producing a first dimmed image in a form to control a stage lighting device to produce an output lighting effect, said second dimmer device producing a second dimmed image at a different dimming level than said first dimmed image to control a display that is monitoring said first dimmed image, where a view on said display is at a different brightness level than said first dimmed image.

12. A method as in claim 11, wherein said first and second dimmer devices are analog dimmers.

13. A method as in claim 12, wherein said first and second dimmer devices are analog multipliers.

14. A method as in claim 11 further comprising detecting an error in the digital video generator, and dimming said first dimmed image, but not dimming said second dimmed image based on said error.

15. A method as in claim 14, wherein said second dimmer device is controlled to dim the said dimmed image to a maximum dimming amount.

16. A method as in claim 14, wherein said detecting an error comprises determining if a signal which is periodically received from said digital video generator has been received in a specified amount of time, and establishing an error when the signal is not received for a specified amount of time.

17. A method as in claim 16, wherein said signal which is periodically received from said digital video generator is a fading value for current frames.

18. A method as in claim 11, further comprising using said second dimmer device to produce a second dimmed image based on an electronic control, where said first dimmed image is at a different dimmed level than said second dimmed image, and displaying said second dimmed image on said display, showing an entire image on said display as being brighter than said output lighting effect.

19. A method as in claim 18, further comprising using said first dimmed image to control said stage lighting device to display an image.

20. A method as in claim 11, wherein said digital video generator and said second dimmer device are physically separated from one another, and where the control signal is used to form said image on the digital video generator, and used to create a supplemental control signal to control a dimming level on the second dimmer device, wherein said image on the digital video generator is brighter than said output lighting effect.

21. A method as in claim 20, wherein said supplemental control signal is a USB control signal.

22. A method as in claim 20, further comprising detecting whether the supplemental control signal has been updated in a specified time, and controlling only the second dimmer device to produce a dimming level indicative of a black signal that controls said output lighting effect, but not to dim said image on the digital video generator, when the supplemental control signal has not been updated in the specified time.

23. A method as in claim 22, wherein said dimming level indicative of a black signal comprises a maximum dimming level.

24. A method, comprising:
receiving an image indicative of an output to be produced by a lighting projector from a first computer that has a video card and produces an output, and a dimmer board that is separate from said first computer;
on said dimmer board, dimming said image using first and second dimmers, that are separately controlled, to create using a first dimmed version of said output from said first computer to produce a user interface display including said image and to create a second dimmed version of the output from said first computer to produce a lighting output to be projected that controls said lighting projector;
detecting, using a second device that is separate from said first computer, a malfunction in the first computer, and dimming said second dimmed version to a maximum dimming amount, while not correspondingly dimming said first dimmed version when said malfunction is detected.

25. A method as in claim 24, wherein said dimming said second dimmed version to a maximum dimming amount comprises controlling the second dimmer to create an amount of dimming that prevents said second dimmed version from being seen.

26. A method as in claim 24, wherein said receiving an image comprises using the first computer to create an image at a specified intensity which can be changed.

27. A method as in claim 24, wherein said detecting a malfunction comprises periodically receiving a specified control signal from the first computer, and detecting that the control signal has not been received at a specified time.

28. A method as in claim 27, wherein said specified control signal is a frame update signal.

29. A method as in claim 24, wherein said detecting comprises detecting that a frame update signal indicative of a new value is produced by said first computer for a current frame, has not been received at a time of a current frame.

30. A method as in claim 24, wherein said dimming said second dimmed version to a maximum dimming amount comprises receiving said lighting output to be projected, and multiplying said lighting output to be projected by a specified multiplication factor.

31. A method as in claim 24, wherein said second dimmer device separately produces red, green and blue components.

32. A method, comprising:
in a dimmer board that is separate from a computer, receiving an indication of image information to be displayed by an external projector;
using said dimmer board to produce video information to be sent to the external projector at a first brightness; and
detecting an operation of said computer, and preventing said external projector from producing the image information at said first brightness if a processing error occurs in said computer, while producing monitored information at a normal brightness even when said processing error occurs in said computer,
where said dimmer board includes first and second dimmers, that are separately controlled, responsive to detecting said processing error to dim the image information to be displayed by the external projector to an amount which hides said image information to be displayed by the external projector, and to display said monitored information at said normal brightness even after said processing error.

33. A method as in claim 32, further comprising producing a plurality of output indications in a controlling console which control a plurality of different lights, and receiving one of said output indications in the processing computer.

* * * * *